United States Patent [19]

Fairweather

[11] Patent Number: 5,214,785
[45] Date of Patent: May 25, 1993

[54] CONTROLLER WITH KEYBOARD EMULATION CAPABILITY FOR CONTROL OF HOST COMPUTER OPERATION

[75] Inventor: John R. C. Fairweather, Los Angeles, Calif.

[73] Assignee: Third Point Systems, Inc., Santa Monica, Calif.

[21] Appl. No.: 413,115

[22] Filed: Sep. 27, 1989

[51] Int. Cl.$^5$ .................. G06F 11/30; G06F 11/00; G06F 9/455

[52] U.S. Cl. .................. 395/800; 395/275; 395/500; 364/707; 364/234; 364/238.3; 364/264; 364/926.93; 364/928; 364/927.81; 364/948.6; 364/DIG. 2

[58] Field of Search ... 364/200 MS File, 900 MS File, 364/138, 707; 395/275, 800, 500; 340/706

[56] References Cited

U.S. PATENT DOCUMENTS

| | | |
|---|---|---|
| 3,731,280 | 5/1973 | Shevlin ............... 364/200 |
| 4,051,326 | 7/1977 | Badagnani et al. ........ 364/900 |
| 4,204,249 | 5/1980 | Dye et al. ............ 364/200 |
| 4,680,732 | 7/1987 | DiCenzo .............. 364/900 |
| 4,716,542 | 12/1987 | Peltz et al. ........... 364/900 |
| 4,747,041 | 5/1988 | Engel et al. .......... 364/200 |
| 4,779,079 | 10/1988 | Hauck ................. 340/706 |
| 4,839,802 | 6/1989 | Wonak et al. ......... 395/275 |
| 4,878,196 | 10/1989 | Rose .................. 364/900 |
| 4,908,612 | 3/1990 | Bromley et al. ....... 340/706 |
| 4,964,075 | 10/1990 | Shaver et al. ......... 364/900 |

Primary Examiner—Thomas C. Lee
Assistant Examiner—Paul Harrity
Attorney, Agent, or Firm—Beehler & Pavitt

[57] ABSTRACT

A microcontroller peripheral system is interfaced to the existing keyboard input of an unmodified host computer while supporting normal keyboard operation of the host. The controller is independently powered and responds to keyboard input with the host powered down. The peripheral is interfaceable for controlling or monitoring a wide variety of real world devices, and can power up the host to initialize any desired application program on the host by emulating keyboard input. The controller can establish two-way communication with the host through a serial port by initializing a communication program on the host via emulated keyboard input.

3 Claims, 12 Drawing Sheets

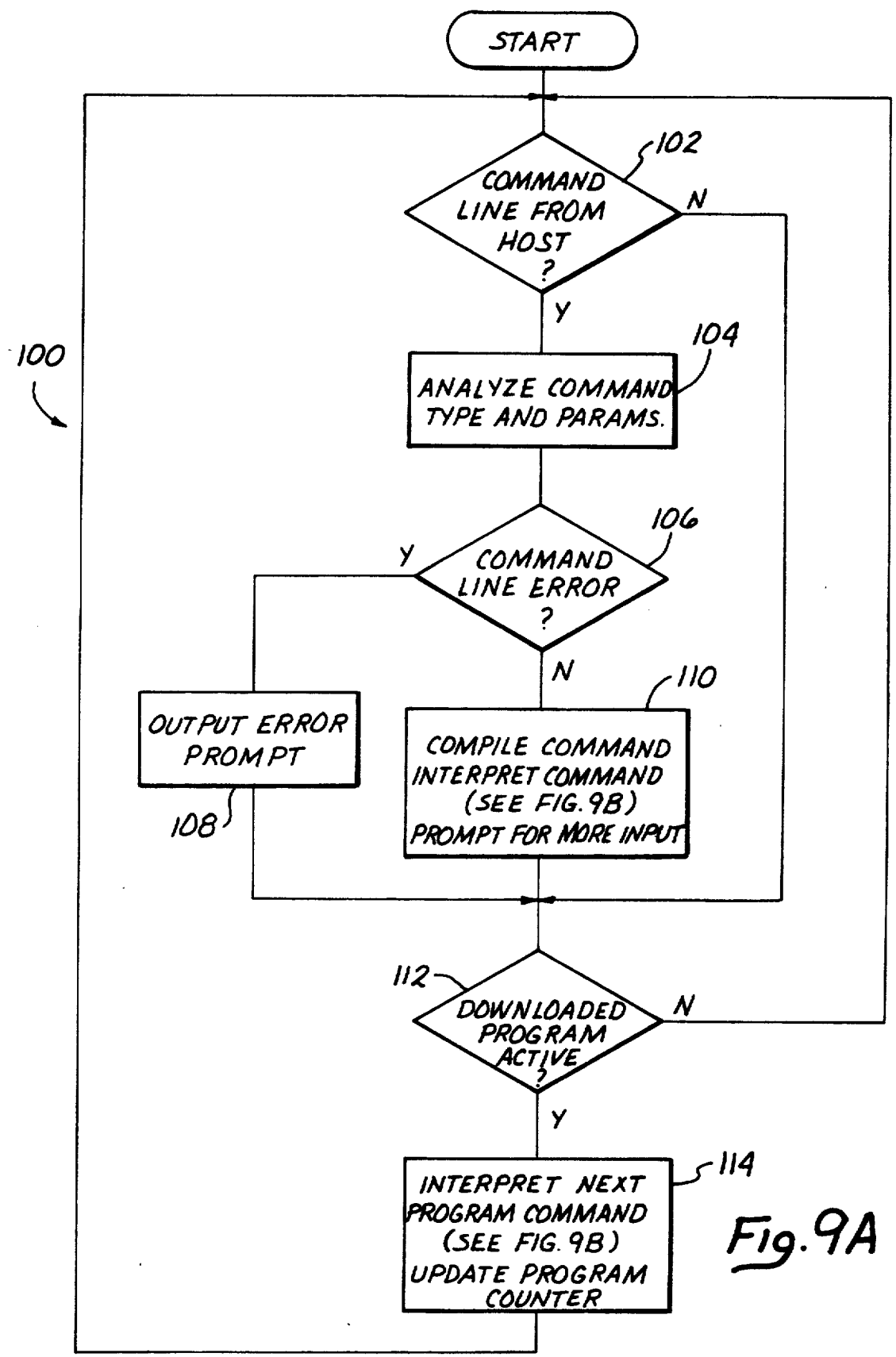

Fig. 9B

```
                        ( START )
118                       116                     128
 \                         |                       /
  SWITCH JUMP TO APPROPRIATE COMMAND HANDLER BASED
              ON COMPILED COMMAND OP-CODE
```

CMD="JK" (JUMP ON KEYBOARD SEQUENCE) — APPROX 100 / 120 — CMD="KS" (SEND KEYBOARD SEQUENCE)

122 SCAN KEYCODES BUFFER FOR MATCH WITH SEARCH SEQUENCE SUPPLIED.

OTHER COMMAND HANDLERS:
- "EX"-EXECUTE PROGRAM
- "LP"-LOAD PROGRAM
- "RE"-RESET
- "JI"/"JO"-JUMP IF HOST ON/OFF
- "OP"-OUTPUT DISCRETE VALUES
- "DI"-DISPLAY INPUT DISCRETES
- "H1"/"L1"-POWER OUTLET 1 ON/OFF
- "H2"/"L2"-POWER OUTLET 2 ON/OFF
- "ST"-SET TIME
- "GO"-GO TO SPECIFIED LABEL
- "JS"-JUMP ON RS232 STRING
- "JB"/"JA"-JUMP BEFORE/AFTER GIVEN TIME
- "SS"-SEND RS232 STRING
- "WF"-WAIT FOR SPECIFIED PERIOD
- "ON"/"OF"-TURN ON/OFF X-10 MODULE
- "DM"-DIM X-10 MODULE
- "XC"-SEND X-10 CONTROL SEQUENCE
- "TL"-SET INPUT TRANSITION LEVEL
- "OH"/"OL"-SET OUTPUT TO HIGH/LOW
- "JH"/"JL"-JUMP IF INPUT HIGH/LOW
- "JT"/"JF"-JUMP IF FLAG TRUE/FALSE
- "ST"/"SF"-SET FLAG TRUE/FALSE
- "SA"-SET FLAG AFTER DELAY
- "AI"-DISPLAY ANALOG INPUT
- "HD"/"HE"-HOST DISABLE/ENABLE
- "ID"-DISPLAY S/W VERSION NUMBER
- "GS"/"RS"-GO TO/RETURN FROM SUBROUTINE
- "LR"-LOAD REGISTER
- "AR"/"SR"-ADD/SUBTRACT REGISTER
- "DR"/"DF"/"DT"-DISPLAY REGISTER/FLAG/TIME
- "SO"/"SI"-SEND/RECEIVE SERIALLY ENCODED I/O
- "CR"-COMPARE REGISTER ...ETC. ETC.

124 SEQUENCES MATCH? — N → (loop back) — Y → 126 SET INTERPRETED PROGRAM COUNTER TO JUMP ADDRESS-1. UPDATE KEYCODES BUFFER POINTER TO SKIP MATCHED SEQUENCE.

130 EXTRACT NEXT KEY CODE OF SEQUENCE

132 DATA AND FREE FLAGS SET? — N → (loop) — Y →

DISABLE KEYBOARD TRANSMIT ONE BYTE OF KEYCODE SEQUENCE TO HOST ACCORDING TO PROTOCOL SPECIFIED BY KBD. ID.(SEE TEXT FOR DETAILS) RE-ENABLE KEYBOARD CLEAR DATA & FREE FLAGS

134 SEQUENCE COMPLETE? — N → (loop to 130) — Y 136

( END )

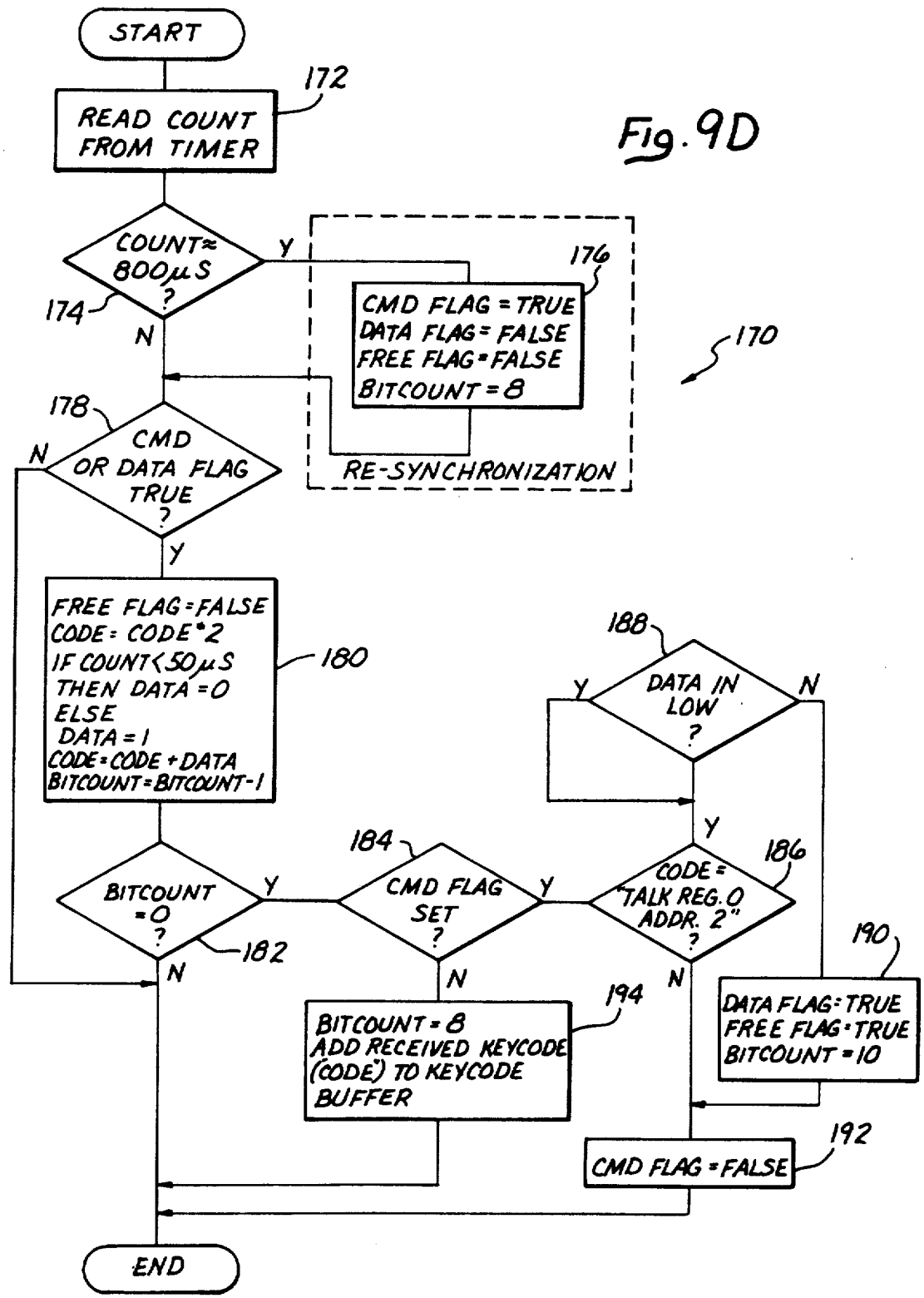

CONTROLLER WITH KEYBOARD EMULATION CAPABILITY FOR CONTROL OF HOST COMPUTER OPERATION

BACKGROUND OF THE INVENTION

1. Field of the Invention

The present invention pertains generally to the field of electronic digital computers and more particularly relates to a general purpose programmable controller interfaceable to the keyboard input of a host digital computer by means of a keyboard interface normally transparent to keyboard operation of the host. The controller can take command of the host by emulating keyboard input. The controller is further interfaceable to sensors and actuators either via direct wiring or using encoded signals sent over the power lines. The controller can relieve the host of input/output and control tasks with the host system either operational or powered-down. The controller can power-up a self-booting host microcomputer and load an application program if the greater capability of the host is required. The host may in turn program the controller via a serial communications link.

2. State of the Prior Art

Microcomputer installations are now widespread in homes, offices and industry and increasingly are employed for controlling other devices in an intelligent, flexible manner under control of an application program. Common examples are security systems and environmental heating/air conditioning/ventilation systems. A disadvantage of using a general purpose microcomputer in such applications is that most of the computer's capability is wasted in applications where infrequent action by the computer system is required in response to real world events. Nevertheless, the computer must remain operational and idle while awaiting such infrequent occurrences. Other applications require frequent but low level tasks of a nature which do not require the full capabilities of a general purpose microcomputer and could instead be performed by a much smaller and economical controller system. In these and many other situations it would be desirable to provide a device peripheral to the microcomputer which could relieve the microcomputer of low-level tasks, such as monitoring sensors, switches and transducers while retaining the capability of bringing on line the full power of the host microcomputer in the event that higher level capability is required, e.g, in response to some event detected by the controller peripheral. Therefore, the peripheral device should be capable of bringing up a desired application program on the host microcomputer from a fully powered down state of the host system, thereby eliminating the need for running the host system continuously. Equally important, the peripheral system should be easily interfaceable to any one of various popular general purpose microcomputers by modestly skilled users.

SUMMARY OF THE INVENTION

This invention provides a versatile, programmable controller system interfaceable to a general purpose microcomputer host for handling a wide range of input/output and control tasks. The controller system of this invention is characterized by a keyboard interface which is connected in-line between the host computer's keyboard input and the existing host system keyboard, without modification to the host system. The keyboard interface is transparent to normal keyboard operation of the host. The controller system is further characterized in that, in a preferred form, it is generic to a variety of popular general purpose microcomputers which differ from each other in their keyboard protocols. The generic controller configures itself to a particular host system by reading upon power-up initialization an identification code which is advantageously incorporated in an adapter accessory which also carries host-specific cable connectors and interface components needed to properly configure and connect the controller to a specific host.

It is contemplated that the controller system described below will be typically implemented as a self-contained peripheral to a host microcomputer. For this reason, and because the system of this invention is difficult to characterize in terms of a particular function given its versatility, the invention is generally referred to as the peripheral, the peripheral system, or the peripheral controller, to distinguish it from the host system for purposes of the following description. Also, it will be understood that the term microcontroller used through the description is not used in a limiting sense and generally includes microprocessor systems capable of performing in an equivalent manner.

The peripheral system includes a peripheral microprocessor or microcontroller unit and a keyboard interface for connection in-line between the keyboard input and the keyboard of the host computer system. In a typical configuration, the peripheral will include ROM storage for resident software including the keyboard interrupt handlers as well as such commands, input/output and control procedures as may be deemed desirable. The peripheral will normally also include RAM storage for temporarily storing data received from such devices as may be interfaced to the peripheral, and in particular for storing application programs downloaded to the peripheral by the host. An advantageous implementation of the peripheral system utilizes a low cost microcontroller package featuring on-chip ROM and UART for serial communication with the RS-232 communications port of the host.

The keyboard interface includes hardware and software components. The hardware aspect includes a data line circuit and a clock line circuit to accomodate keyboard protocols which use both data and clock signals as well as those which only use a data line; the software aspect includes keyboard interrupt handler algorithms for each keyboard protocol to be handled by the controller system. The top level software normally executed by the peripheral microcontroller runs in an all time loop; on each pass of the loop, the microcontroller may potentially receive, interpret and execute a command from the host via a serial data link. Alternately if an application program has been loaded into peripheral system memory, by the host or otherwise, and is executing, a single instruction from that program is interpreted and executed on each pass. All other activity of the controller peripheral is interrupt driven. While a variety of interrupts may be provided, of particular significance are the two keyboard interface interrupts, data and clock, derived respectively by the data and clock line circuits of the keyboard interface.

The keyboard interface circuits provide the peripheral microcontroller with continuous monitoring of data and clock signal traffic between the host and its keyboard, enabling the peripheral microcontroller to insert properly synchronized emulated keyboard input on the host keyboard lines without violating keyboard protocol. The keyboard interface in a passive monitoring mode is transparent to normal keyboard operation of the host system, and during peripheral-to-host transmission the peripheral is functionally indistinguishable from the keyboard to the host.

The peripheral microcontroller can assume command of the host system by emulating keyboard command input for any desired purpose, such as loading a communications program on the host to support a high-speed serial data link between host and peripheral. Communications software or other application software can be loaded on the host once the host has been brought up to the operating system level, which in self-booting microcomputers happens simply as a result of applying power to the host. Once a data link is established between host and peripheral, the host can download instructions or an application program for subsequent execution by the peripheral without further intervention by the host, unless such intervention is again requested by the controller peripheral system.

The peripheral can be equipped for switching power to the host system under control of the peripheral microcontroller, enabling the host system to be powered down whenever it is not required by the peripheral system. Conversely, the controller is able to bring up a self-booting host computer system, such as most personal microcomputers, from a fully powered-down state to an operating system level, and then, by means of the keyboard interface, load any required application program on the host system when needed, as for example, in response to some real world input received by the controller through its own input lines.

The peripheral system can be self-contained with its own power supply, externally to the host system. Power to the keyboard may be supplied by the peripheral system rather than the host, enabling keyboard input to the peripheral with the host powered down.

The peripheral microcontroller typically has a number of I/O lines interfaceable to a wide variety of user-provided sensors, switches, transducers, actuators, etc. The capabilities of the controller peripheral can be greatly enhanced by providing the means to switch A.C. power to lights and appliances by means of X-10 compatible control signals transmitted over existing A.C. power wiring, or an infrared remote controller, whereby the peripheral system is then able to intelligently control a wide range of commercially available equipment such as home entertainment video and audio systems without physical connection or other modification to the controlled equipment. This interfacing is accomplished via a standard 4 wire connection comprised of a peripheral-generated 5 volt supply together with a 12 volt high power output and a 0–5 volt analog input, both of which may be serially encoded.

These and other features and advantages of the present invention will be better understood by reference to the following detailed description and accompanying drawings.

BRIEF DESCRIPTION OF THE DRAWINGS

FIG. 9A is a flowchart diagram of the top level continuous loop software executed by the peripheral microprocessor 14 in FIGS. 1–3.

FIG. 9B is a flowchart showing typical command handler subroutines addressable by the peripheral microcontroller;

FIG. 9D is a flowchart of a keyboard interrupt handler for the Apple ADB keyboard protocol;

DETAILED DESCRIPTION OF THE PREFERRED EMBODIMENTS

Figure 1:
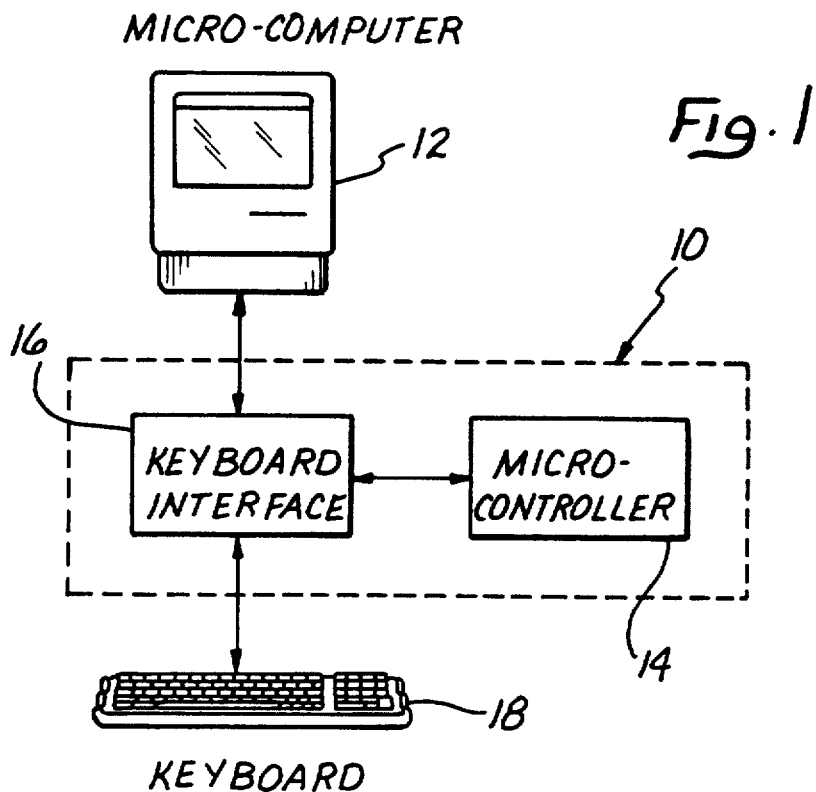
FIG. 1 shows a basic configuration of the controller peripheral of this invention interfaced to a typical host microcomputer.
Figure 2:
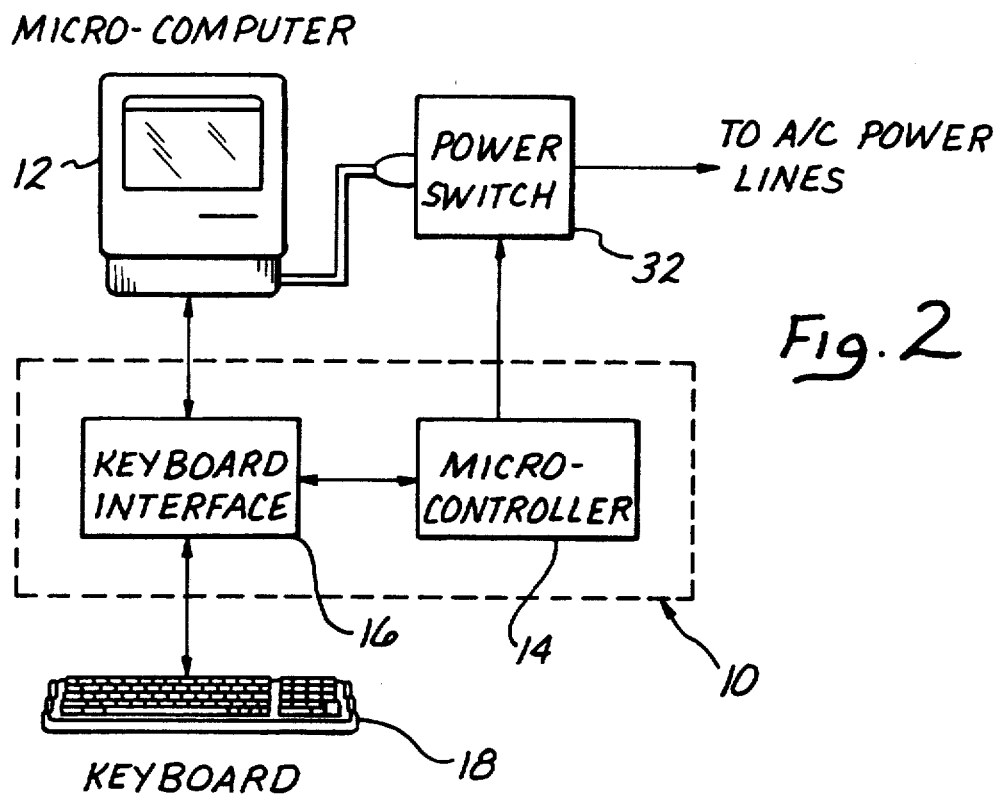
FIG. 2 shows the system of FIG. 1 enhanced for switching A.C. power to the host.

With reference to the drawings, FIG. 1 shows the controller peripheral system 10 of this invention enclosed in dotted lining and interfaced to a general purpose microcomputer host system 12. The peripheral system 10 generally includes a peripheral microcontroller ($\mu$C) unit 14 connected to a keyboard interface 16. The keyboard interface 16 is connected in-line between the host system's keyboard 18 and the existing keyboard input connector (not illustrated) of the host 12. FIG. 2 shows the basic peripheral system 10 enhanced by the addition of a power switch 32 controlled by the peripheral $\mu$C 14 for switching A/C power to the host computer 12. The power switch 32 typically may be a power relay of adequate power handling capability switchable between ON/OFF states by a control signal asserted by the $\mu$C 14.

Figure 3:
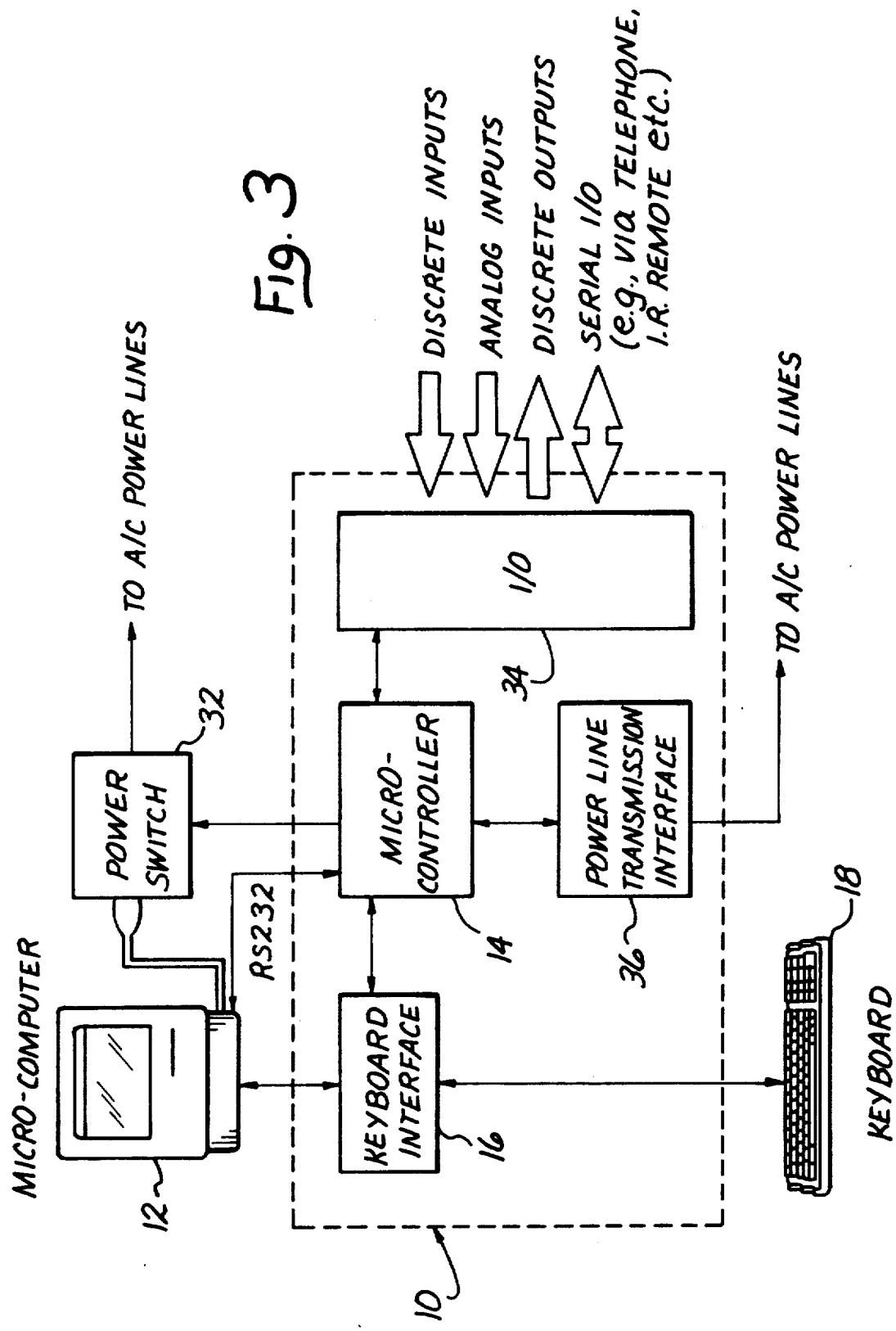
FIG. 3 shows the system of FIG. 2 connected by serial communications link with the host and interfaced for input/output with typical external transducers and devices.

FIG. 3 illustrates still another enhancement of the peripheral system 10 by addition of I/O (input/output) circuits, generally designated by numeral 34, which will typically include a number of separate input lines and output lines. The input lines may be discrete inputs for sensing the state of switch-type sensors, or analog inputs for interfacing the peripheral system 10 to various user selected analog transducers, such as temperature or pressure sensors. These inputs will be typically interfaced to the $\mu$C 14 by an A/D (analog-to-digital) converter connected in a conventional manner for this purpose. The I/O circuits 34 may also include a number of output lines for driving user-selected external devices such as relays, motors, lamps, etc., through suitable power drive circuits capable of converting the logic output signals of μC 14 into the necessary drive currents, voltages and waveforms. At least some of the the I/O lines of the I/O system 34 may be dedicated for serial data input/output, e.g. for interfacing the μC 14 to the telephone lines, to infrared remote controllers, and the like.

FIG. 3 also shows the μC 14 linked to the host computer 12 by a serial data link such as an RS232 communications line which links the existing serial data port of microcomputer 12 to the UART (universal asynchronous receiver transmitter) which is available on-chip in microcontrollers such as the presently preferred Z-8 device. The FIG. 3 configuration also includes a power line transmission interface 36 such as model PL-513 available from X-10 U.S.A., Inc., North Vale, N.J., through which μC 14 can control power to appliances, A/C powered lamps, etc. plugged into X-10 power control modules available from the same source. The interface 36 is preferably driven through an output line of μC 14 with signals conforming to the X-10 system protocol defined by the manufacturer.

Figure 4:
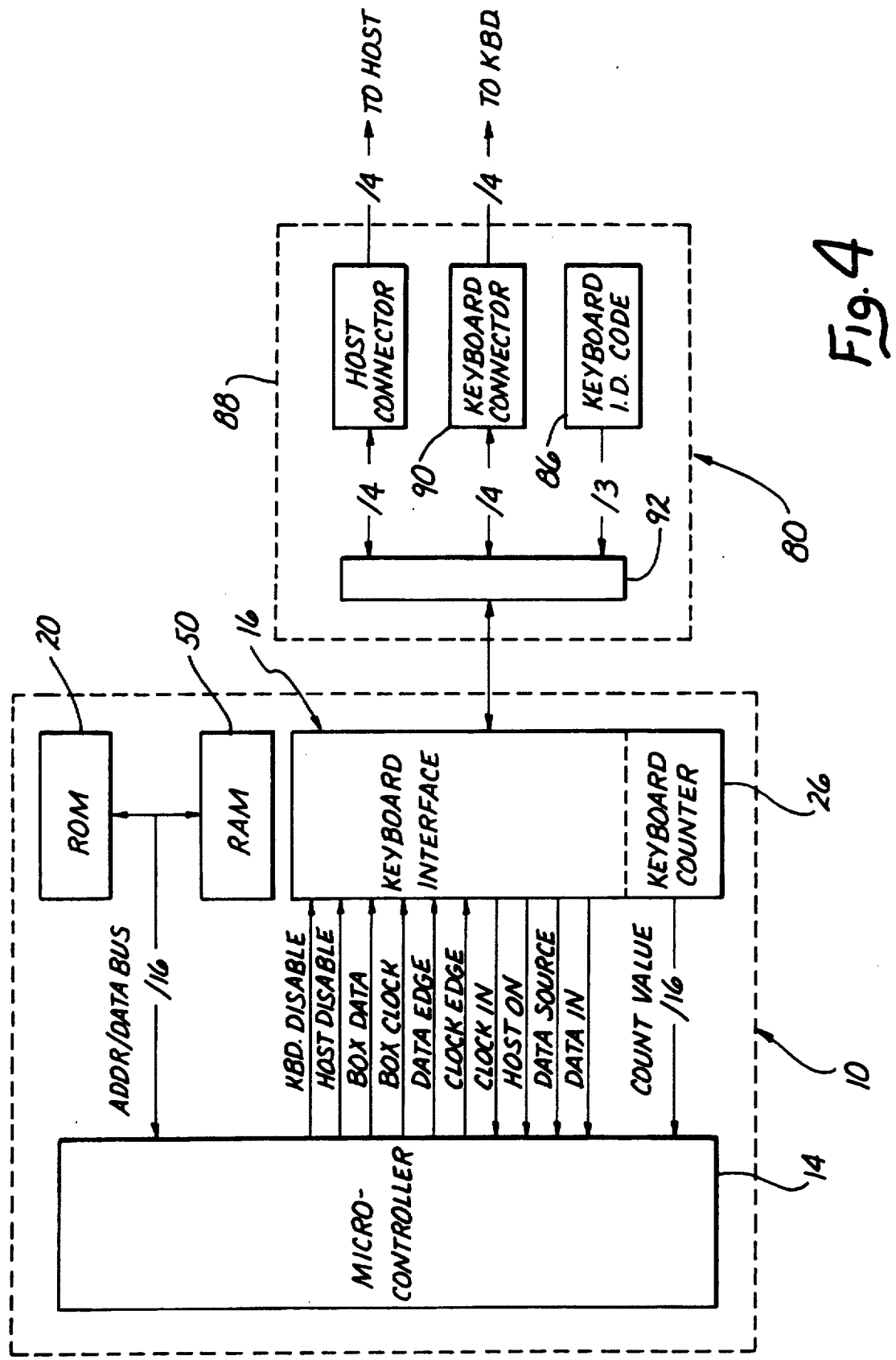
FIG. 4 is a block diagram of a minimal configuration of the peripheral controller system.
Figure 9C:
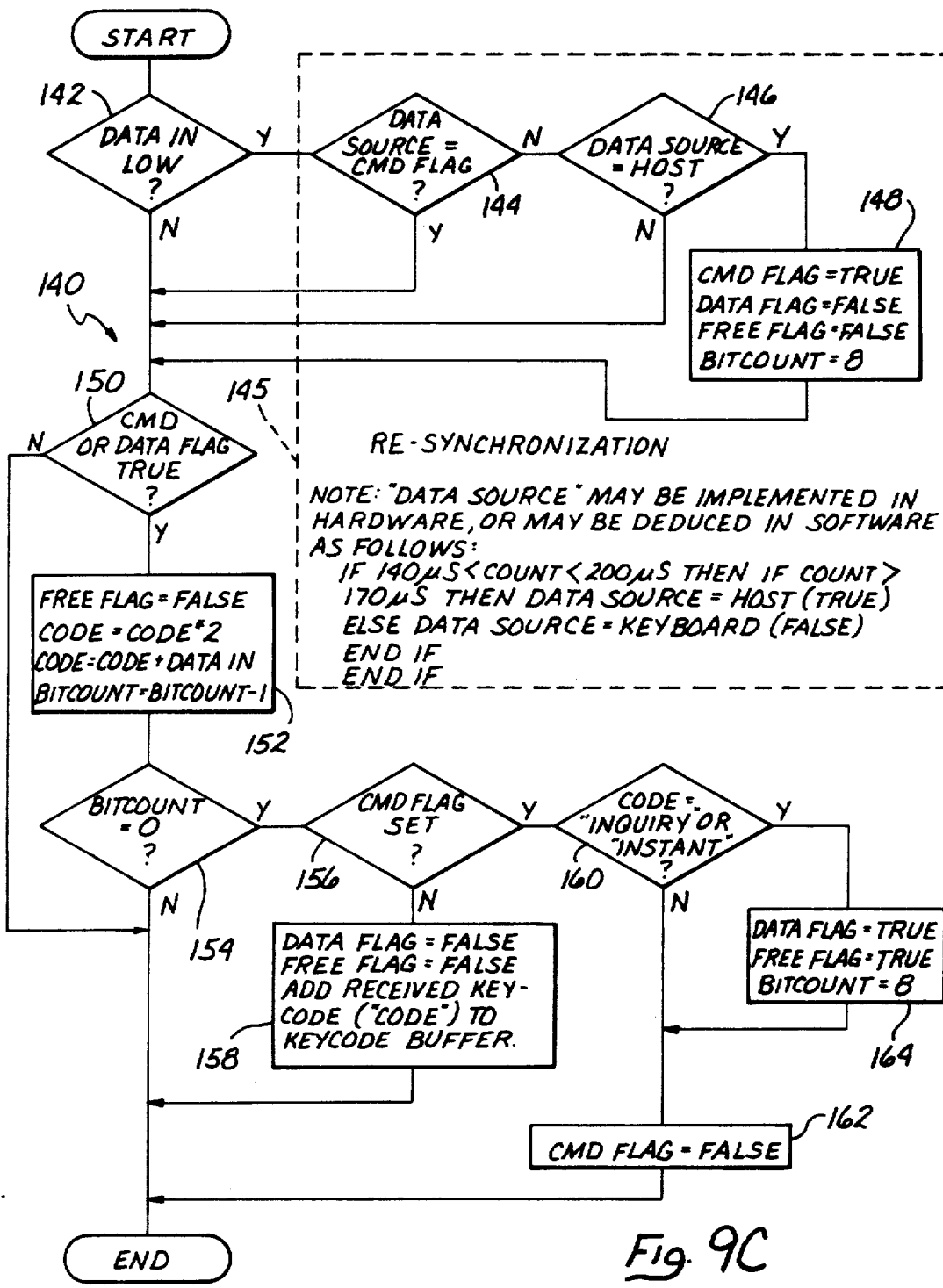
FIG. 9C is a flowchart of a keyboard interrupt handler for the classical Macintosh keyboard protocol.
Figure 9E:
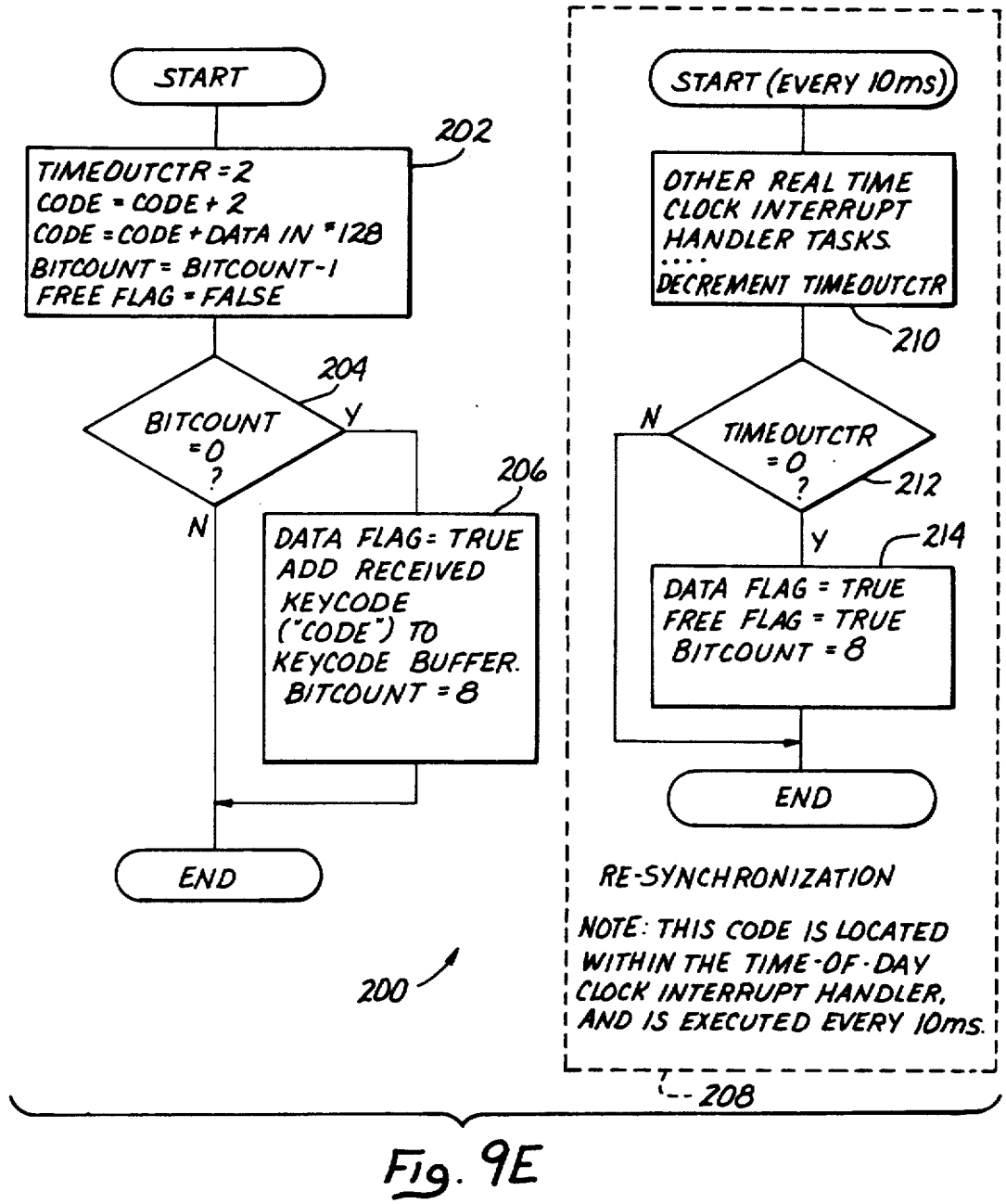
FIG. 9E is a flowchart of a keyboard interrupt handler for the IBM PC keyboard protocol.

FIG. 4 illustrates a basic configuration of the peripheral system 10 such as implemented in FIG. 1. A suitable choice for the peripheral μC 14 is a Zilog Z8 microcontroller unit with on-chip ROM (read-only-memory) 20. The keyboard interface includes hardware and software components. The hardware component of the keyboard interface includes keyboard interface circuits 16, disclosed in two alternate embodiments in FIGS. 5A, 5B and 6A, 6B. The keyboard interface circuits 16 are interconnected with the μC 14 for input/output of keyboard data and clock signals and for interface control signals, as will be described. The software component of the keyboard interface includes the top level system software normally executed by μC 14 and one or more keyboard interrupt handler routines stored, along with still other peripheral software, in ROM 20. Each interrupt handler interprets keyboard signals received by μC 14 according to a particular keyboard protocol. A particular keyboard interrupt handler, examples of which are given in FIGS. 9C, 9D, and 9E, is selected by a protocol select routine also stored in ROM 20 which executes upon initialization of μC 14 by polling certain microcontroller inputs connected to some coding device preset for identifying the host system. For example, a host-specific adapter 80, shown in FIG. 7, which includes a hardwired three-bit keyboard protocol identification binary code 86 made up by selectively grounding three connector pins J1–J3.

THE KEYBOARD INTERFACE HARDWARE

The keyboard interface hardware is generic to a variety of keyboard protocols in common use, including but not limited to the IBM PC/XT/AT protocol, the Apple Desktop Bus (ADB) protocol, and the older or classical Macintosh protocol. Most common microcomputer keyboard interfaces utilize two power lines (ground and +5 v) and two signal lines, referred to here as clock and data, although signal line names and uses may vary from one host to another. The purpose of the keyboard interface described below is to provide, for each of the signal lines, a bi-directional three-way node between the host system, the keyboard, and the peripheral controller system. Specifically, the objectives are as follows:

1. To permit bi-directional communication between the keyboard and the host computer through the interface circuit such that each device is functionally and electrically unaware of the presence of the interface circuits, i.e., the keyboard interface circuits are transparent to normal keyboard/host communications when inserted in-line between host and keyboard.

2. To permit continuous monitoring of host/keyboard communication by the peripheral μC 14 with the ability to break into the keyboard signal lines at any time and force simulated keyboard signals to the host, or alternatively to force simulated host signals to the keyboard by the peripheral controller system. This interruption must occur in such a way that the normal keyboard protocol of the particular host is not violated. The peripheral μC must also determine the source (host or keyboard) of any signal on either the clock or data lines, and measure precisely the timing of high or low pulses on the lines, which is necessary under the ADB protocol.

3. That the interface be generic to a variety of commonly used microcomputers each using a different keyboard protocol, so that the peripheral system can be used interchangeably with any one of these microcomputers, and further that the peripheral keyboard interface be capable of accomodating still other keyboard protocols without hardware modification, by merely adding appropriate interrupt handler routines and other software for execution by the peripheral μC.

4. It is preferred that power to the keyboard be supplied by the peripheral controller system rather than the host so that the keyboard remains operational and monitored by the peripheral controller, even after the host is powered down. A "host on" signal derived from the host power-line to the keyboard indicates host availability to the peripheral controller.

Bi-directional keyboard signal lines (e.g. data and clock lines) all operate on the principle that whenever the line is inactive, it is pulled up to a logic high state through a large value resistor; it is never actively driven high by either the keyboard or the microcomputer. Either the keyboard or the host may actively drive the line low in order to transmit information. In its simplest form, therefore, a transparent interface circuit must present this same "active-low/passive-high" interface to each of the two devices connected to it.

Figure 5A:
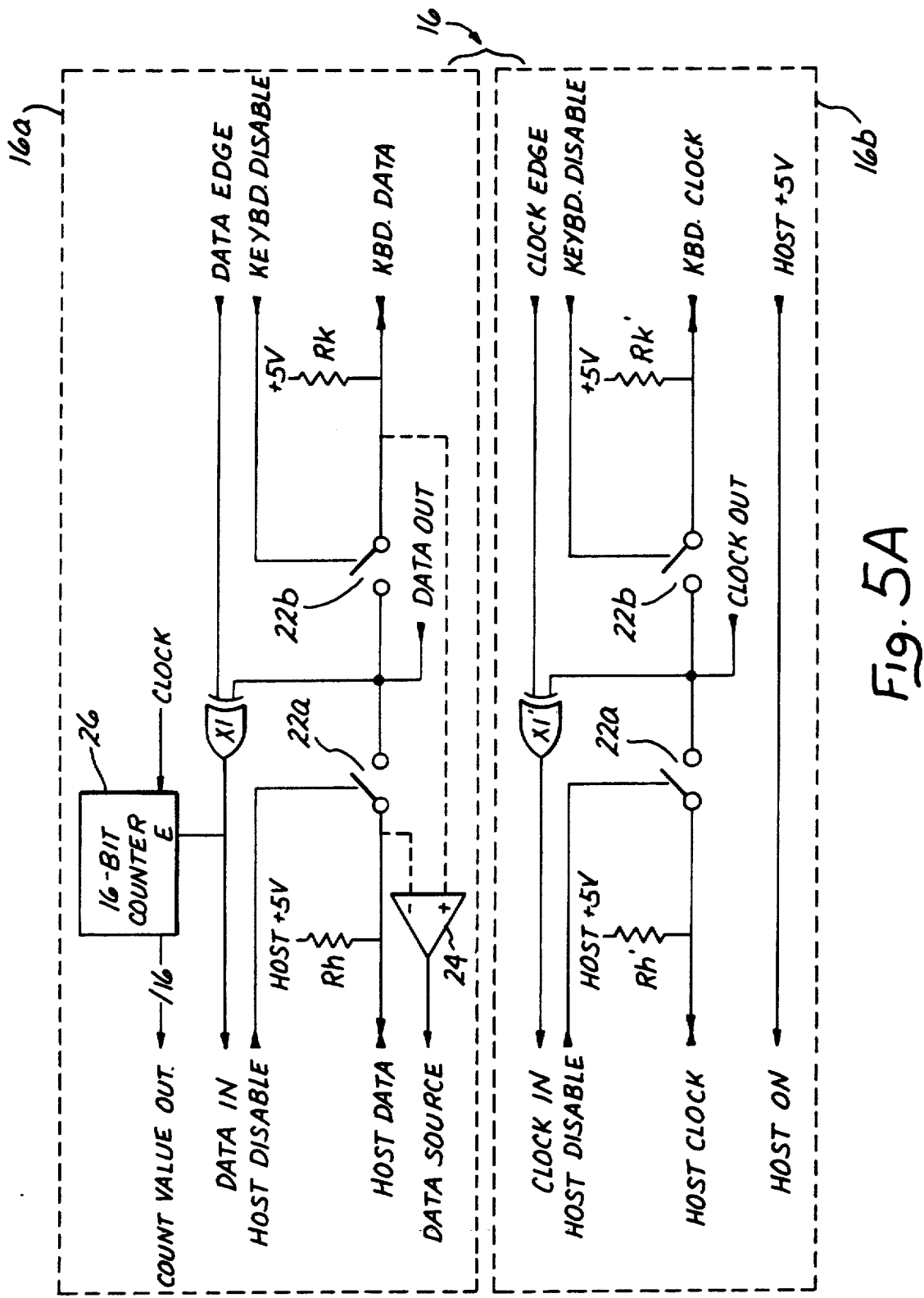
FIG. 5A is a simplified circuit diagram of the generic keyboard interface circuit.

A simplified circuit diagram of an interface circuit 16 which meets the above objectives is shown in FIG. 5A. The generic keyboard interface includes a data line circuit 16a and a clock line circuit 16b which are similar in operation. The signal labels capitalized in the following description refer to corresponding signal labels in FIGS. 4, and 5A through 6B.

HOST DATA and KEYBOARD DATA are connected to the host and keyboard data lines respectively, while HOST CLOCK and KEYBOARD CLOCK are connected to the host and keyboard clock lines respectively in those host systems which require a clock line to implement their keyboard protocol; otherwise the clock line circuit of the interface need not be connected to either host or keyboard and may be disabled by the interface software. With switches 22a and 22b closed, the data and clock lines of the host and keyboard are interconnected and exchange signals normally.

In order to allow the peripheral microcontroller to monitor host-keyboard signal exchanges and to insert data sequences of its own, the following interface signals are provided, with equivalent signals found in the clock line circuit of the interface:

1. A DATA OUT input used by the peripheral μC to force its own signals onto the keyboard data line. These peripheral-generated signals must obey timing constraints identical to keyboard generated signals so as not to violate keyboard protocol, a requirement met by appropriate peripheral system software executed by μC 14.

2. Two control signals termed HOST DISABLE and KBD.DISABLE; these two signals control the state (ON or OFF) of switches 22a and 22b to select the direction in which any signals placed on the DATA OUT line will be sent on the data line. When HOST DISABLE is asserted, communication is between the keyboard and the peripheral μC 14 only. When KBD.DISABLE is asserted, communication is between the peripheral controller and the host microcomputer only.

3. An input signal termed DATA EDGE which may be set by the peripheral μC software to determine whether the peripheral μC 14 should be interrupted on a rising or a falling edge for either the HOST DATA or KBD.DATA signals. This signal also controls the polarity of the DATA IN signal described below, as well as whether the data line pulse length timer 26 described below counts the length of low or high pulses on the data lines.

4. An output signal termed DATA IN which reflects the current state of the data line. If the DATA EDGE signal is high, DATA IN reflects the inverse of the data line state. By forcing a desired polarity on the DATA IN line, this signal may be used to generate an interrupt to the software (DATA IN goes from high to low ) selectively on either a falling or rising edge on the data lines. All keyboard signal traffic on both the data and clock lines is continuously monitored by the μC 14 by way of the DATA IN and CLOCK IN signal lines. It will be noted that keyboard traffic on both data and clock lines is bidirectional, i.e., signals may originate from either the host and the keyboard.

5. It is therefore necessary to provide a means by which the peripheral microcontroller can determine the source of the signals being received at any given time on the DATA IN and CLOCK IN lines. A DATA SOURCE signal for this purpose can be derived from either hardware or software. A hardware implementation may include a comparator 24 with inputs connected to the HOST and KEYBOARD sides of the data line as in FIG. 5A so that the state of the comparator output is determined by whether the host or the keyboard is pulling the data line to a logic low. A software implementation of the DATA SOURCE signal is exemplified by the pseudocode listing shown in FIG. 9C, which discriminates between host and keyboard signals based on differences in pulse lengths from the two sources. The ADB protocol and the IBM PC protocol (FIGS. 9D and 9E) both make an implicit DATA SOURCE determination based on timing.

6. A COUNT VALUE input to μC 14 derived from a pulse length counter 26 driven by a suitable clock input for a count resolution of at least 2 micro-seconds and which may be configured by the software using the DATA EDGE signal in the manner just described to accurately measure the length of either high or low pulses on the data line. Whenever the DATA IN signal is high, the counter 26 is enabled; when DATA IN goes low, the count is stopped and held for reading by the software. This pulse length counting capability is necessary for more complex keyboard protocols such as Apple's ADB keyboard interface. Such protocols convey information principally by varying the time ratios between high and low levels, rather than simply using the signal level state as in other protocols.

INTERFACE CIRCUITS

Two practical embodiments of the keyboard interface circuits are described below. Since the data line and clock line interface circuits are identical, the following description refers only to the data line circuit of each embodiment.

CIRCUIT EMBODIMENT 1

Figure 5B:
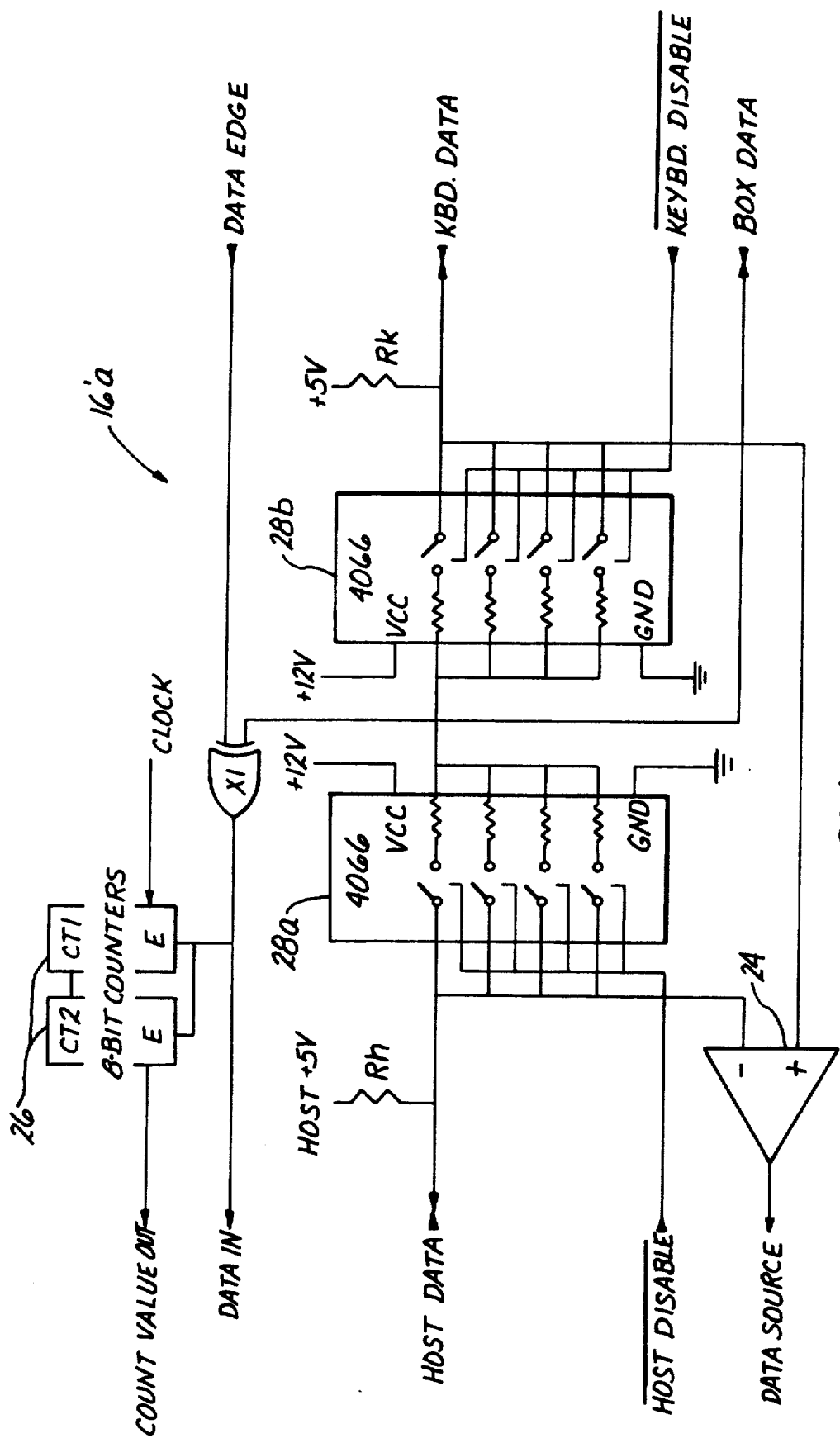
FIG. 5B is a circuit diagram of the data line circuit in a first embodiment of the keyboard interface.

The circuit shown in FIG. 5B accomplishes the keyboard interface objectives listed above using analog switches 28a, 28b to implement the switches 22a, 22b of FIG. 5A, taking advantage of features specific to the μC 14, namely the availability of tri-statable input/outputs.

In the interface circuit of FIG. 5B the host and keyboard interact with each in a normal manner through the interface circuit while the analog switches 28a, 28b are closed, or "ON", offering a direct signal path to keyboard signal traffic. Because common analog switch devices, such as the 4066 type specified in FIG. 5B, typically exhibit an "ON" resistance of up to 100 ohms with a 12 v supply, it is necessary to parallel at least four switches on each side of the interface to guarantee a total resistance through the circuit of less than 50 ohms. This ensures that for the smallest value pull-up resistor to be anticipated in a host system (470 ohms on the ADB data line), the host and keyboard can still drive reliable low signals through the interface circuit. Typical pull-up resistor values found on the clock line are significantly larger, so the 100 ohm resistance of a single analog switch suffices, and parallel switches are not necessary. The DATA SOURCE signal is derived by a voltage comparator 24 with inputs connected between the host and keyboard sides of the data line as shown in FIG. 5B. Operation of the comparator relies on the voltage drop caused by the switch resistance (up to 0.5 volts in the case above). Providing the voltage drop is significantly larger than typical comparator offset (i.e. 5 mv), the comparator output would give the correct DATA SOURCE signal indication whenever the data line is low. However, given a possible minimum single switch resistance of 5 ohms (2.5 ohms through both switches 28a,b), and a minimum drop of 25 mv required to reliably operate comparator 24, the maximum allowable pull-up resistance for reliable operation is about 500 ohms. Adjustments to the host and keyboard pull-up resistances in order to meet this requirement can be made on the keyboard adapter 80 described below. An alternative approach is for the interrupt handler software algorithms to deduce the data source from signal timing. In the case of the ADB and IBM PC interrupt handlers (FIGS. 9D and 9E), this is already the case. The classical Macintosh interrupt handler would be modified according to the pseudo-code listing given in FIG. 9C.

Note that in the circuit of FIG. 5B, the DATA OUT line is connected directly to the mid-point of the two analog switch groups 28a, 28b, requiring that the microcontroller software be able to reconfigure this line as either an input (in which case the microcontroller pin is tri-stated so as not to affect the logic level of the keyboard signal line and thus allowing uninterrupted host/keyboard communication), or an output (in which case the software may actively drive the data line high or low to communicate with the host or keyboard). Most microcontrollers have at least some I/O pins which exhibit this capability.

CIRCUIT EMBODIMENT NO. 2

Figure 6A:
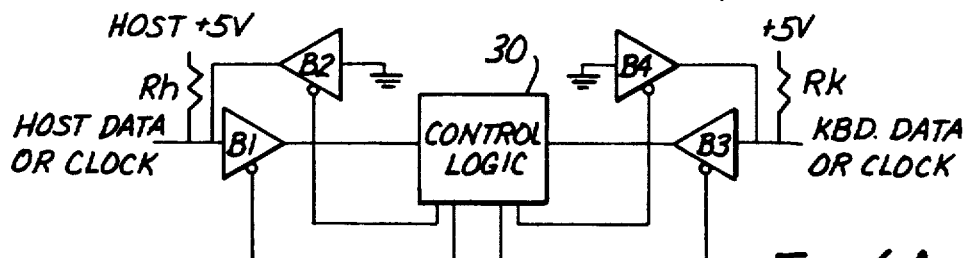
FIG. 6A is a simplified diagram of the data or clock line circuit in a second embodiment of the keyboard interface.
Figure 6B:
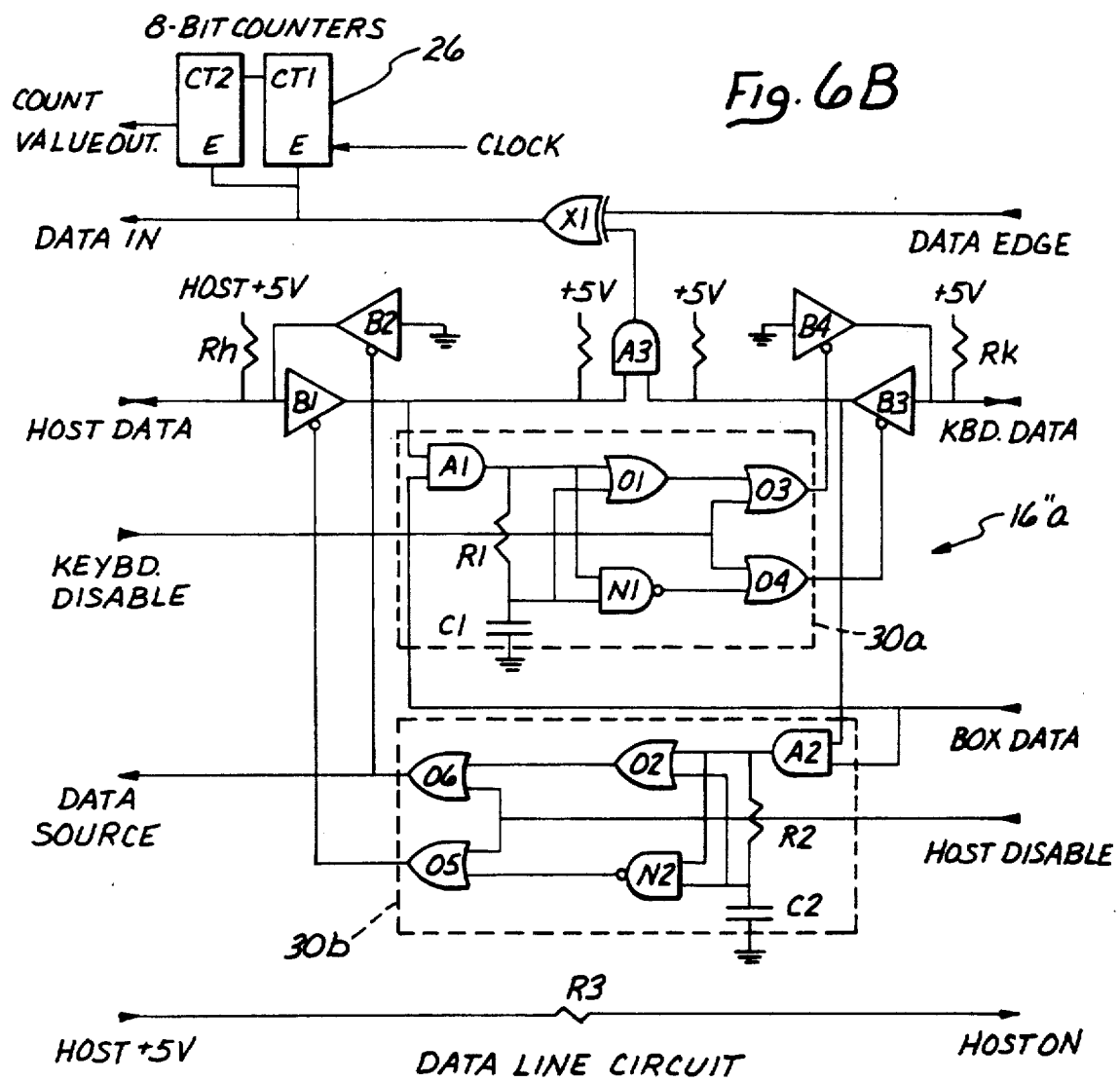
FIG. 6B is a circuit diagram of the data line circuit in the embodiment of FIG. 6A.

The second interface circuit embodiment, shown in FIGS. 6A and 6B implements the function of switches 22a, 22b and control the various signals described above in connection with FIG. 5A using logic controlled line driver/receiver pairs. This circuit is ideally suited for incorporation into a gate array or custom IC, and also has the advantages that it may be interfaced to a wider choice of commercially available microcontrollers for use as the peripheral $\mu$C 14.

This interface circuit embodiment does not offer a direct signal path between the HOST and KBD. (Keyboard) sides of the data and clock lines; rather signals are actively and bi-directionally driven through line driver/receiver pairs B1,B2 and B3,B4, controlled by logic 30. The signal line labels capitalized in the following description refer to the corresponding signal labels in FIGS. 6A and 6B. The interface control logic must ensure the following:

1. When both HOST DATA and KBD.DATA are inactive (pulled high), buffers B2 and B4 must be tri-stated or inactive. Buffers B1 and B3 must be enabled so that the logic state of the signal line is passed through the interface by the control logic.

2. When HOST DATA goes active low, buffer B4 must be enabled and buffer B3 disabled, thus passing the logic low out on the KBD.DATA line and preventing it from feeding back through B3 into the control logic which would cause confusion as to the true source of the low signal. The disabling of B3 must occur at the same time or before the enabling of B4.

3. When HOST DATA goes high again, buffer B4 must be disabled and buffer B3 enabled. Because the KBD.DATA line is now being pulled up to five volts through resistor Rk, rather than driven, it will take a time Tk given by Tk = 1/(Rk*Ck) to reach a high level. In this equation, Ck is the total capacitance in the keyboard and the peripheral-to-keyboard cable. Therefore, to ensure that a momentary low-going pulse passing through B4 is not fed back into the circuit through B3, the control logic must delay enabling of B3 for at least time Tk after B4 is disabled.

4. Likewise, a low going edge received from keyboard on the KBD.DATA line must cause the control logic to first disable B1 and then enable B2. When KBD.DATA goes high again, the re-enabling of buffer B1 must be delayed by time Th = 1/(Rh*Ch) after buffer B2 is disabled. Here Ch is the total capacitance in the host circuitry and peripheral-to-host cable.

5. In general Rh does not equal Rk, nor does Ch equal Ck. Pull up resistor values and capacitance on the clock and data lines differ and vary widely from one microcomputer/keyboard to the next. For this reason the delays inserted by the control circuitry must be configured to each target host system.

The circuits comprising the logic 30 of FIG. 6A are shown in FIG. 6B. Resistors R1 and R2 are fixed, while capacitors C1 and C2 are incorporated in the host-specific keyboard adapter (described below) to correctly match interface circuit timing to Tk and Th respectively (see discussion above), such that Th is less than T2 = 1/(R2*C2), and Tk is less than T1 = 1/(R1*C1). Changes at the outputs of AND gates A1 and A2 will be delayed by time intervals T1 and T2 respectively at the other side of resistors R1 and R2.

Thus the outputs of OR gates 01 and 02 will go high immediately on a rising edge but will be delayed by times T1 or T2 before going low on a falling edge. The outputs of NAND gates N1 and N2 will go high immediately on a falling edge but will be delayed by T1 or T2 before going low on a rising edge, driving the various buffer enable signals connected to these gates in the proper sequence detailed above. OR gates 05 and 06 implement the HOST DISABLE function while OR gates 03 and 04 implement the KBD.DISABLE function. With the DATA IN signal set high, AND gates A1 and A2 simply pass any signals appearing at the outputs of B3 and B1 into the rest of the circuit. Microcontroller 14 under program control may disable either the host (thus suppressing this path through A1) or the keyboard (thus suppressing this path through A2) to pass its own signals out to the unsuppressed device via the other input to either A1 or A2. The output of 06 drives the DATA SOURCE line low if the source of the low on the data line is the keyboard, and high if the source is the host. AND gate A3 combines the host and keyboard data signals, the result of which is then XOR'd with the DATA EDGE signal in Exclusive-OR gate X1 to yield the DATA IN signal, as in the first embodiment of FIG. 5B. Again, this signal serves both as the counter enable signal for the sixteen bit pulse length counter 26 made up of cascaded counters CT1 and CT2 in FIG. 6B, and as the interrupt input to the peripheral $\mu$C 14.

THE KEYBOARD ADAPTER

As already stated, the interface circuit of FIG. 5A, as implemented in either FIGS. 5B or 6B, is the hardware aspect of a generic keyboard interface interchangeably useful with a variety of microcomputer systems and different keyboard protocols. A given keyboard protocol may use the data line 16a, 16b in FIG. 5A together for communication between a host computer and its keyboard. It is thus necessary to provide means by which the peripheral system will recognize its host system and keyboard protocol to be handled, to properly configure the keyboard interface and select the appropriate interrupt handler algorithm from among those stored in ROM.

Figure 7:
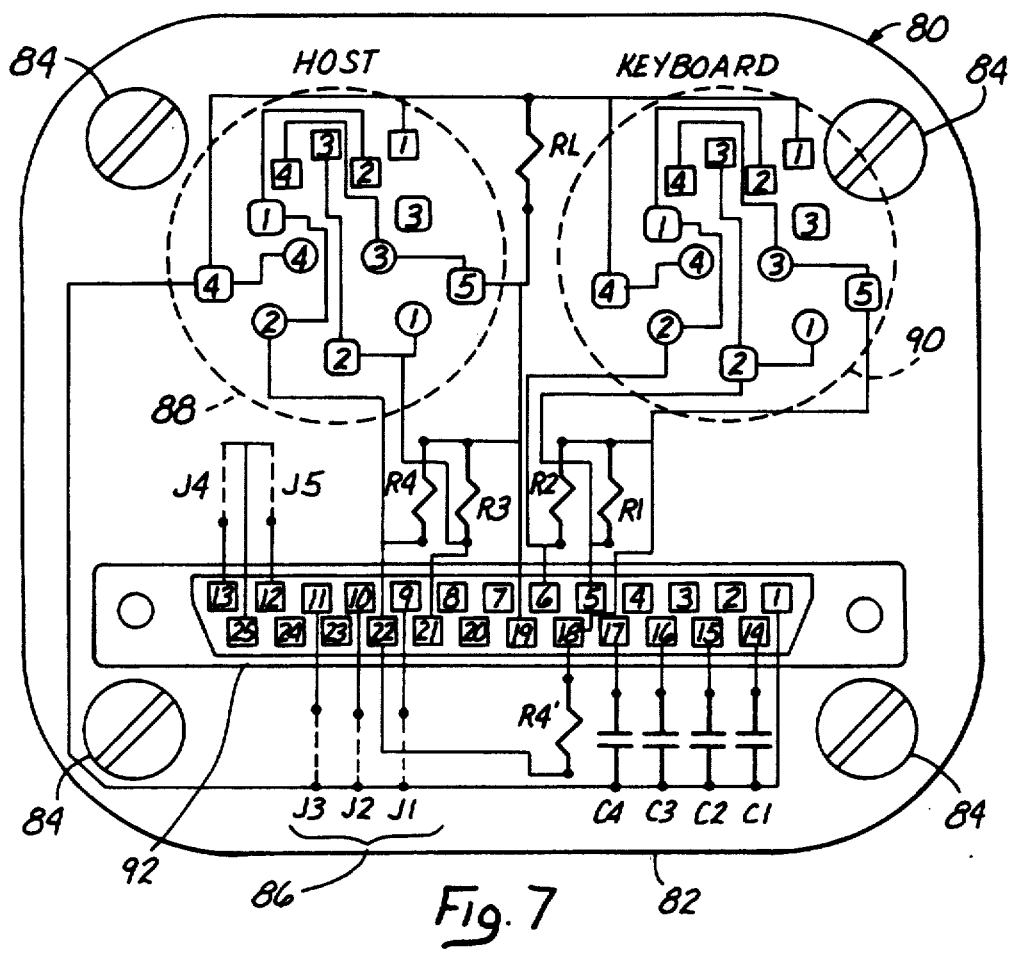
FIG. 7 illustrates the hardware adapter with encoded keyboard protocol identification for the generic keyboard interface.

Configuration of the peripheral system 10 for interfacing to a particular host system affects both the hardware and software. The hardware adjustment involves the pull-up resistors Rh and Rk of both data and clock lines of the interface 16, which should be matched to the values expected by the host system. In addition the choice of which line (clock or data) the timer is connected to is made by installing either jumper J4 (clock line) or J5 (Data line) as shown in FIG. 7. Also, in the second embodiment of the interface circuit of FIG. 6B the values of capacitors C1 and C2 (in both data and clock circuits) should be adjusted to meet the signal rise time requirements described above for that circuit. The software adjustment involves selecting the proper interrupt handler and other routines required for handling the particular keyboard protocol of the target host. This configuration can be achieved by a variety of means such as presettable manual switches, DIP type or the like. It is preferred however to provide a separate hardware adapter which is an accessory device combining the various cable connectors, pull-up resistors, capacitors, and a keyboard protocol/host identification code readable by the peripheral $\mu$C 14 upon initialization.

FIG. 7 shows a keyboard adapter 80 built around a circuit board 82 which may be mounted in a suitable plastic enclosure by means of fasteners 84 and attached for example, to the back of the peripheral controller. Mounted on the circuit board 82 are a host connector 88, a keyboard connector 90 and a peripheral-to-adapter connector 92 (in this example a DB-25) for connecting the peripheral system 10 in-line between the host and its keyboard with pin connections as indicated in FIG. 7. The host and keyboard connectors 88, 90 are selected to mate with the hardware of the specific microcomputer, e.g., IBM PC, Apple ADB or Classical Macintosh microcomputers. The dotted line circles designated by the numerals 88, 90 encompass connection pad clusters which are shape coded for each of the connectors in FIGS. 8A-8C (no pads are shown for the mini-DIN connector of FIG. 8D) with pad numbers indicating the corresponding pin of that connector. The pad coding is square for RJ11, soft-square for DIN-5, circular for ADB. The pad layout is not geometrically accurate for the actual connectors and is intended for explanation only. FIGS. 8A-8D show pin connections for each of various cable connectors which are standard for specific host microcomputers. One of these connector types would be selected for both connectors 88, 90 on a particular keyboard adapter 80 intended for a specific host. The connectors are described in greater detail in the host-specific software sections below. The host connector 88 is connected via a suitable cable to the host's keyboard input while the keyboard connector 90 is connected to the keyboard cable of the host system, using standard cables for the particular host system.

The adapter 80, in addition to serving as a convenient platform for the three cable connectors 88, 90, 92, also performs three additional, host specific functions for configuring the generic keyboard interface system to a specific microcomputer host system.

The first of these functions is to provide appropriate resistance values for the pull-up resistors Rh and Rk and for capacitors C1 and C2 in both data and clock circuits of the interface to set the proper time constants in the embodiment of FIG. 6B. It is desirable to customize the values of the pull-up resistors because large pull-up resistor values will slow down the signal rise time in a manner dependent on external capacitance, which may adversely affect circuit operation by causing drivers B3 or B1 to be enabled before the logic low driven by B4 or B2 has been pulled to a logic high level. For this reason, the host and keyboard pull-up resistors for the clock and data lines are installed on the keyboard adapter, as are capacitors C1 and C2 again for both the clock and data lines. By this expedient, the B3/B4 and B1/B2 timing skews are set to compensate for the external rise times characteristic of the specific host and keyboard to be used, ensuring proper circuit operation.

A second function performed by the keyboard adapter 80 is that of providing a keyboard identification code which is read by the microcontroller 14 under software control as part of the power-up initialization sequence of the peripheral system 10. The keyboard identification code is read by the microcontroller 14 from pins 13, 14 and 15 of the peripheral connector 92, yielding a three-bit binary code. The selective presence or absence of jumpers from each of these pins to system ground makes up the keyboard ID code, causing the peripheral controller software to jump to an appropriate interrupt handler algorithm for the identified keyboard protocol.

The third function performed by the keyboard adapter 80 is to allow the timer circuit shown in FIGS. 5A through 6B to be connected to either the clock line or the data line depending upon the requirements of the protocol being used. The desired line is selected by either installing jumper J4 (Clock line) or J5 (Data line).

PERIPHERAL RESIDENT SOFTWARE

The software resident in ROM memory associated with the peripheral $\mu$C 14 includes an all-time main loop 100 flowcharted in FIG. 9A, a number of command handler subroutines including the JK (jump on keyboard sequence) and KS (send keyboard sequence) flowcharted in FIG. 9B with various other command handlers (such as those headlined in box 120 of FIG. 9B), and various interrupt handlers including the protocol-specific keyboard interrupt handlers. Three keyboard interrupt handlers are flowcharted in FIGS. 9C through 9E for the classical Macintosh, Apple ADB and IBM PC protocols respectively.

Turning to FIG. 9A, the main loop 100 essentially performs two functions on each pass: the first is to check for commands downloaded from the host system 12 through the RS-232 link shown in FIG. 3; the second is to execute one instruction from the current application program (if any) that has been previously downloaded by the host 12 and stored in peripheral RAM 50 (shown in FIG. 4). Step 102 of main loop 100 checks for a flag set by an RS-232 interrupt handler indicating the presence of an ASCII command line downloaded into a peripheral RAM buffer by the host 12. If this flag is set, the system then proceeds to step 104 to verify the command type and any parameters associated with the command. In step 106 a determination is made whether the command string analyzed contains an error in which case an error prompt is output in Step 108 to the host or to a peripheral mounted LED indicator or both. If no error is found in the command line just analyzed, the command is compiled converting the ASCII command into binary, which is then interpreted as shown in FIG. 9B. Step 116 selects the appropriate command handler for execution based on the compiled code. Two such command handlers, designated by the two letter mnemonics "JK" and "KS" are flowcharted in FIG. 9B, with examples of still other command handlers listed in the Box 120 of that Figure. The command handler listing 120 is by way of example only and not exclusive of still other command handlers that may be found useful or appropriate for a given implementation of the peripheral system 10 described above. Each command handler is a sequence of compiled code stored in peripheral ROM 20 and performs various operations such as those suggested in Box 120.

By way of example, the JK (jump on keyboard sequence) command handler 118 at step 122 directs the microcontroller 14 to scan the contents of a keycode buffer (e.g. in RAM 50) for a possible match with a specific key-code search sequence supplied as a parameter to the command. In the event such a sequence match is found, a decision is made at 124 to execute Step 126 whereby the program counter for the stored program being interpreted is set to equal=jump address−1, so that upon returning to the main loop and executing Step 14 in FIG. 9A the program counter will then incremented to the desired jump address. In step 126 the key-code buffer pointer is also updated to skip the key-code sequence matched in the preceeding steps. The JK command routine then returns the system to the main loop 100. The JK (jump on keyboard sequence) command handler thus allows the $\mu$C 14 to react to specific key-code sequences received by the peripheral system from the host keyboard 18 in FIGS. 1-3. The KS (send keyboard sequence) command is generally the converse operation and allows the peripheral system to transmit emulated keyboard input to the host 12. The KS command handler 128 at step 130 extracts a series of binary encoded key-codes to be transmitted to the host. This sequence of codes is supplied as a parameter to the KS command. Step 132 ensures that the KS handler will wait until there is a gap in normal keyboard activity. This is accomplished by checking two software flags set by the keyboard interrupt handler described below. If the "data" and "free" flags are not set step 132 will repeat continuously until they are. Once a gap has been detected, execution proceeds to step 134. The keyboard disable signal is asserted to the keyboard interface 16, as has been previously explained, to open switches 22b in FIG. 5A and corresponding switches in FIGS. 5B and 6B, thereby routing the emulated keyboard signals to the host 12 via the remaining close switch 22a. One byte of the keycode sequence is then placed on the keyboard lines and transmitted to the host 12. Key-code transmission involves conversion of the binary coded key-code to the appropriate signals called for by the host keyboard protocol specified by the keyboard kbd.id 86 preset in keyboard hardware adapter 80, in FIG. 7. Appropriate software must of course be provided to effect this conversion. Following transmission of the key-code sequence byte, the keyboard is reenabled by closing switch 22b in FIG. 5A, and the data and free flags are cleared so as to prevent transmission of the next key-code byte until the interrupt handler again determines availability of the keyboard lines and sets these flags to true. The subroutine 128 then progresses to step 136 to check whether the key-code sequence to be transmitted has been completed; if not the routine loops back as indicated to Step 130 and the entire routine is carried out for the next key-code byte; if the sequence to be transmitted has been completed the subroutine returns to the main loop at Step 114 to interpret the next program command, and so on.

PROTOCOL-SPECIFIC KEYBOARD INTERFACE SOFTWARE

Examples are given below of interrupt handlers for each of the classical Macintosh, the Apple ADB, and the IBM-PC keyboard protocols.

CLASSICAL MACINTOSH KEYBOARD INTERFACE

Macintosh models prior to the Mac II and Mac SE used a relatively simple keyboard interface. Connections are via a four-wire RJ-11 telephone style jack shown in FIG. 8A. The interface uses both the data and the clock lines; the data line is bi-directional, while the clock line is driven only by the keyboard. A detailed description of this keyboard protocol can be found in Chapter 4 of Macintosh Family Hardware Reference (Addison-Wesley Publishing Co., Inc., ISBN 0-201-19255-1). The keyboard ID code (J1 to J3) supplied by the keyboard adapter 80 described above is arbitrarily binary 001. The host side, i.e. connector 88 of the peripheral system interface, must be connected directly to the Mac host system; all other devices (i.e., keyboard and optional keypad) are connected to the keyboard connector 90.

When passively monitoring keyboard operation, the "clock edge" signal is held at logic high by the $\mu$C 14 thus forcing software interrupts to occur only on the rising edge of the host clock signal, at which time the state of the "data in" line will always reflect the desired data bit value. The "data edge" signal is set permanently low thus yielding "true" polarity for the data bits received. Additionally, the "data in" interrupt to the $\mu$C 14 is normally disabled. The timer is connected to the clock line by installing jumper J4 in keyboard adapter 80. Because "clock edge" is high, the counter will count the timing of any low signals on the clock line. Each time the $\mu$C 14 receives a "clock in" interrupt, it reads the value of the "data in" signal until a full 8-bit code (or "byte") has been received. Any time the data line is low, the "data source" line (if implemented in hardware) indicates whether the low is coming from the Mac or the keyboard. By keeping track of the source of lows, the peripheral system is able to ensure that it remains synchronized to the keyboard traffic. All Mac protocol commands issued by the host other than Inquire and Immediate are discarded, and keyboard response codes are ring-buffered and made available for comparison under program control. One possible algorithm for the Classical Mac keyboard clock interrupt handler is flowcharted in FIG. 9C.

The interrupt handler in FIG. 9C is executed in response to a clock-line keyboard interrupt derived as already described by the keyboard interface circuits. The interrupt handler 140 at Step 142 tests for a logic low on the DATA IN line of the keyboard interface. If so, the handler branches into a resynchronization loop 145 enclosed in the dotted line box in FIG. 9C the purpose of which is to keep the peripheral $\mu$C 14 synchronized to the signal traffic on the host keyboard line, i.e. to insure that the peripheral system accurately distinguishes between command sequences issued by the host, and keyboard sequences originated by the host keyboard. For the classical Mac keyboard protocol, this requires that a DATA SOURCE signal be derived as earlier described, either from hardware as described in connection with the keyboard interface circuits in FIGS. 5B, 5C or deduced in software as for example in the pseudo code listing in box 144, which discriminates between host and keyboard originated signals on the keyboard lines based on the different duration of the clock signals in this particular protocol. The signal duration is obtained by means of counter 26 which is enabled (i.e. counts up) when CLOCK IN goes high and stops when this line goes low. The count value output of counter 26 is read and first tested to see if it is a valid clock pulse which will have a low duration falling between 140 and 200 microseconds and then if greater than 170 microseconds DATA SOURCE is set true i.e. indicative of a host signal; otherwise DATA SOURCE is set false meaning a keyboard originated signal. Step 144 tests for equality of DATA SOURCE and Command Flag, the latter a software flag set further down in this subroutine. If the two are equal, it is indicative that the source has not changed from the last comparison made in this interrupt handler for a previous keyboard interrupt, in which case the routine proceeds to Step 150. If an equality is not found at Step 144, it is indicative that the DATA SOURCE has changed and it is necessary to resynchronize the peripheral flags accordingly. If at Step 146 DATA SOURCE is set to keyboard (false) the routine again proceeds to Step 150; otherwise the source must be the host and execution proceeds to step 148 which sets all flags to a state consistent with the start of an 8 bit host command code transmission. The routine then continues at Step 150 testing command and DATA flag; if neither or true, the interrupt handler routine ends and the μC 14 returns to the main program 100 in FIG. 9A. If either flag is set, the interrupt handler continues to step 152. Step 152 sets the free flag to false and shifts the value of DATA IN into the least significant bit of the received code byte. The count of the number of bits received is decremented by one.

In step 154, bit count is tested for 0, indicative that eight bits, a full byte, have been accumulated into "Code". If not, the interrupt handler returns the μC to the main loop, waiting for the next interrupt triggered by the next bit of data. If a full byte has been received, then step 156 uses the value of command flag to determine if the byte corresponds to host or keyboard data. If command flag is false, the routine proceeds to step 158, clearing the data and free flags and entering the received key-code byte ("code") into a key code buffer, thus ending the interrupt handler routine and returning the μC to the main loop 100. If at step 156 source is found to be the host, the routine proceeds to step 160 checking the "code" byte for match with "inquiry" or "instant" command bytes issued by the Mac host to its keyboard. If no such match is found, the byte is discarded and command flag is set false at step 162 ending the interrupt handler routine 140. If a match is found at step 160, step 164 then sets data flag and free flag to true thereby ensuring subsequent bits received to be interpreted as keyboard data, and also synchronizing with the KS command handler 128 in FIG. 9B in the event that a program running on μC 14 requires transmission of a keyboard sequence. Setting data and free flags to "true" in step 164 indicates availability of the keyboard lines thus allowing the send keyboard sequence command 128 to run as has been explained. Following step 164, the interrupt handler routine 140 goes through step 162 and ends.

When the μC 14 wishes to transmit a key code sequence to the Mac, the main loop software running on μC 14 monitors the keyboard lines as described above until a rising edge is detected on the data flag. In response it disconnects all downstream devices (keyboard, etc.) by asserting the "keyboard disable" signal. When the Mac sets the data line high, and after a short pause, the peripheral 10 sends the key down sequence for the first character of the string using 330 μs clock cycles on the "CLOCK OUT" line and the necessary sequence of ones and zeros on the "DATA OUT" line. The protocol used exactly matches that which would have been produced by the standard Mac keyboard. In response to the next Inquiry command by the host the next key code is sent by μC 14. This process is repeated until the entire string has been transmitted at which time the μC software reverts to normal operation. It is understood that appropriate software must be provided to enable the μC 14 to generate emulated keyboard characters for transmission to the host. Note that the key down and up codes for individual keys need not necessarily be adjacent in the sequence as for example when holding down a shift or option key. The actual keyboard response to the original Inquiry is discarded, and since the keyboard does not see any subsequent Inquiry commands, it will be inactive at the time "keyboard disable" is removed by the peripheral system.

Under program control, and presumably due to the fact that the Mac is not powered up, the peripheral system software may assert "host disable" and take over the host's role in communication with the keyboard. If the Mac is in fact powered up, it will assume that the keyboard is missing and will send regular Model Number commands. As soon as "host disable" is removed, this will result in a keyboard reset and resumption of normal communication. When emulating the Mac host in this manner, the μC 14 sends Inquiry commands to the keyboard at regular intervals and monitors the keyboard response exactly as described above. Again, suitable software must be provided for this purpose.

APPLE ADB KEYBOARD INTERFACE

For the Apple II GS, Mac SE, Mac II, and all subsequent Macintosh models, a more sophisticated "desktop bus" known as Apple ADB is used to communicate between the Mac and the keyboard, mouse or any other devices attached to the ADB. Connections are via a 4-pin ADB connector shown in FIG. 8B. The ADB interface uses the bi-directional data line exclusively, although in the case of the Mac II and later models, pin 2 of the connector is used to convey a "power on" signal which when grounded, turns on the computer. This pin is connected to the otherwise unused HOST CLOCK signal line; the μC 14 can thus turn on the host by driving low its CLOCK OUT line. A detailed description of this keyboard protocol can be found in Chapter 19 of Macintosh Family Hardware Reference (Addison-Wesley Publishing Co., Inc., ISBN 0-201-19255-1). The keyboard ID code supplied by the generic keyboard adapter 80 of FIG. 7 is arbitrarily binary 010. The host side, connector 88, of the peripheral controller system 10 must be connected directly to the host computer keyboard input; all other ADB devices are connected to the peripheral system keyboard connector 90.

When operating with an ADB interface, both the clock and data line interrupts are enabled. The "clock pulse" interrupt will only occur when the clock line is grounded by the "on" switch on the keyboard. If the host has not been explicitly disabled by software being run on μC 14, this signal is simply passed through to the host, causing it to be turned on. If the host has been so disabled, the clock signal is inhibited, and the software presumably uses some other trigger event to initiate host turn on. When passively monitoring keyboard operation, the "data edge" signal is left permanently high thus forcing interrupts to occur only for a rising edge on the data line. Additionally, this means that the 16 bit timing counter 26 will count the timing of all low pulses on the data line, and that the final count will be available to μC 14 when the interrupt occurs. Since in ADB protocol the polarity of a data bit is determined by its timing, and not its level, there is no impact as far as data bit polarity reversal is concerned. The "data pulse" interrupt handler examines the final count and uses the results to determine the kind of transaction that is occurring. When an 800 μs "attention" signal is seen, the handler enters a mode whereby the next byte of data received will be interpreted as a command code. Once the command code is received, it is checked to see if it is intended for a keyboard or not. If not, subsequent data bits will simply be discarded. If the handler determines that this is a keyboard "talk register zero" command, it enters a mode whereby subsequent data bytes will be interpreted as key transition codes and added to the transition code ring buffer as for other protocols. High and low data bits can be distinguished by their low times (35 μs for a low and 65 μs for a high). During transmission of a data byte, there will be a "data in" interrupt approximately every 100 μs, so the interrupt handler code must complete in substantially less than 100 μs. One possible algorithm for the keyboard data interrupt handler is flowcharted in FIG. 9D.

FIG. 9D flowcharts the keyboard interrupt handler specific to the Apple ADB protocol. This interrupt handler is in many ways identical to routine 140 described above, but due to the different protocol used in the ADB must accomplish the same objectives in a slightly different manner. In particular the value of the received data bit must be deduced from DATA line pulse timing as shown in step 180; however accumulation of data bits into code bytes is identical to that described for routine 140. Resynchronization with keyboard traffic is accomplished by detecting the 800 μS "attention" signal which always precedes a host command transmission (see step 174). Step 176 is identical in form and purpose to that described previously for step 148. Steps 182 and 184 correspond exactly to 154 and 156 in routine 140. Step 194 differs slightly from 158 in that the data and free flags are not cleared since there will always be two bytes transmitted by the keyboard for each host command. To facilitate reception of the second byte, Bitcount is reset to 8 in step 194. Step 186 corresponds to step 160 in routine 140 but the command of interest in this case is "Talk Register 0 Address 2". The addition of step 188 is necessitated by the need to ensure the the data and free flags are not set until after the end of the current 100 μS bit cell. Hence the algorithm loops waiting for a rising edge on the DATA IN signal. When the desired edge is detected, execution proceeds to step 190 which corresponds to step 164 in routine 190. Note that in this case Bitcount is set to 10 thus ensuring that the "stop bit" associated with the host command and the "start bit" associated with the keyboard response will be discarded to yield only the desired data bits in the finally accumulated byte value code.

Note that all other signals on the bus will also result in entry to the interrupt handler, but there is no sequence of bus signals that will result in erroneously adding a data byte to the ring buffer before the next Attention signal re-synchronizes everything.

When the peripheral system wishes to transmit a key code sequence to the computer, the normal software waits to see a rising edge on the data flag produced by the algorithm above. It then immediately asserts "keyboard disable" and disables interrupts. After 230 μs, the software then sends a data bit followed by two data bytes from the desired sequence, followed by a stop bit. Service request is not required. Note that the 230 μs delay allows for the 30 μs remaining of the stop bit followed by a 200 μs stop bit to start bit delay. This will ensure that the actual keyboard response (which is discarded) will complete before the peripheral's transmission does. The data flag is now cleared, "keyboard disable" is removed, and interrupts are re-enabled. The software then re-enters the sequence listed above until such a time as the entire key code transition sequence has been transmitted. If an odd number of bytes is to be transmitted, the last transaction must be padded with a null transition as required by ADB protocol.

Under program control, and presumably due to the fact that the Mac is not powered up, the peripheral system software may assert the "host disable" signal, and take over the host's role in communicating with the keyboard. If the Mac host is in fact powered up, it will assume that the entire ADB bus has been disconnected. When emulating the host, the peripheral system only communicates with the keyboard, and all other ADB devices are inoperative. At regular intervals, the peripheral system sends out a "Talk register 0" command to the keyboard and receives the result in an identical manner to that shown above. Service Requests are ignored, since they may emanate from other ADB devices. The keyboard is polled with sufficient regularity to ensure that no characters will be lost.

It is possible to connect other ADB devices upstream of the peripheral system (between it and the host) so that only the keyboard traffic is intercepted. This allows operation of other devices by the host to continue unaffected while the peripheral system intercepts all keyboard traffic.

Note that when "host disable" is asserted by the peripheral system, depressing the "power on" key on the keyboard of a Mac II or other computer for which this signal is implemented will have no effect. However, since this key results in a key transition sequence, the application program in the μC RAM 50 may be structured in such a way that on seeing this sequence, or indeed any other sequence, perhaps a password, it removes the "host disable". The code associated with removing "host disable" automatically checks the status of the "host off" signal from the keyboard interface, and if this signal is asserted, it sends a momentary low out on the clock line. For non ADB systems, this has no effect since power to the host is supplied by other means. In the case of a Mac II or another ADB device for which the "power on" signal is implemented, this will have the effect of turning on the host computer.

For ADB hosts only, in addition to emulating the keyboard, the peripheral system software is capable of inserting simulated mouse movements and button clicks. The algorithm and operation for doing this is unchanged from that described above, except that an additional flag, the "mouse" flag, will be set by the interrupt handler whenever it detects a "Talk register 0" command directed at the mouse. The main software running on the peripheral μC 14 can then insert mouse movements and button settings in an identical manner to that used to insert keyboard sequences. Using this capability, peripheral system programs have access to the full functionality of the Macintosh graphical user interface.

IBM KEYBOARD INTERFACE

Figure 8A:
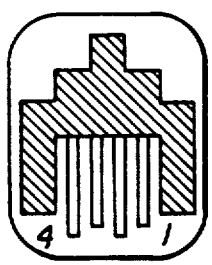
FIGS. 8A, 8B, 8C, and 8D show various alternative cable connectors for installation on the hardware adapter to match the hardware and pin connections of the selected host.
Figure 8B:
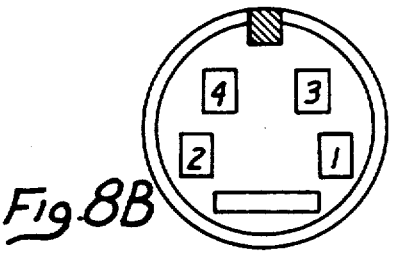
Figure 8C:
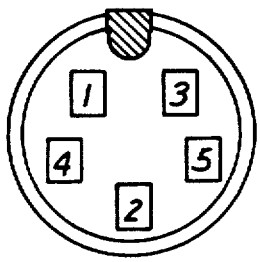
Figure 8D:
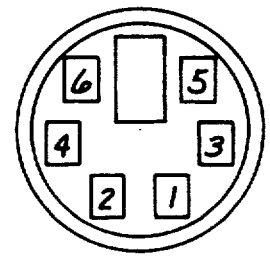

The IBM PC utilizes a keyboard interface very similar to that found in the classical Macintosh. The connector is a 5 pin DIN type; pins 4 and 5 carry the 5 volt supply (pin 4 is ground, pin 5 is +5 v), pins 1 and 2 are bidirectional, pin 1 carries the clock signal, pin 2 carries the data. The IBM PS/2 series utilizes a 6 pin mini-DIN type connector, pins 2 and 6 are reserved, pin 3 is ground, pin 4 is +5 V, pin 5 carries the clock signal and pin 1 the data. Other than the rearranged pin connections, scan codes and operation of the PS/2 keyboard interface is identical to that of the PC/AT enhanced keyboard. A detailed description of the IBM keyboard protocol may be found in Chapter 2, p. 68-74 of IBM PC Advanced Troubleshooting and Repair by Robert C. Brenner, ISBN 0-672-22590-5 (Howard W. Sams & Co., 1988). The keyboard connector pinout for an IBM PC, AT or compatible is shown in FIG. 8C, and that for the PS/2 is shown in 8D. The keyboard ID code may be binary "011". The peripheral system 10 is connected between the host and the keyboard.

The IBM keyboard interface is even simpler than the classic Macintosh in that, apart from reset signals, it is essentially unidirectional, i.e., the keyboard initiates and clocks all activity on the lines with the μC 14 simply monitoring signal traffic between host and keyboard. When passively monitoring the keyboard operation, the "clock edge" signal is set permanently high by the μC 14 thus forcing interrupts to occur on a rising clock edge, at which time the state of the "data in" line will always reflect the desired data bit value. The "data edge" signal is forced permanently low thus yielding "true" polarity for all data bits received, and the timing counter 26 will count the timing of high pulses. The "data in" interrupt is permanently disabled. The peripheral software uses elapsed time as measured by the μC 14 clock to ensure that it does not lose synchronization with the keyboard traffic. Each time a keyboard clock interrupt occurs, a counter is set to 2, this counter is decremented by each real-time clock tick (10 ms) and if it reaches zero (between 10 and 20 ms elapsed time), BitCount is reset to 8. This ensures that in the event that the peripheral system loses synchronization with the keyboard traffic, it will automatically re-align itself at the first gap in the clock pulses, i.e., within one key transition. Note that the least significant data bit is sent first, so the data must be assembled by shifting down into the most significant bit (MSB) rather than the normal left shift and add. One possible algorithm for the "clock pulse" interrupt handler is flowcharted in FIG. 9E.

FIG. 9E flowcharts the IBM PC clock interrupt handler routine 200. Again there are many similarities with routine 140 described previously. In the case of the IBM PC, the source of data is never in question since it is always the keyboard, hence routine 200 contains no logic associated with this determination. In particular, there is no equivalent for steps 156, 160 and 164. Also, for this reason routine 200 makes no use of "cmd flag". Step 202 corresponds exactly to step 152 in routine 140, however, in this case data bits are shifted into the most significant bit of the code byte since the IBM protocol transmits the bits in reverse order. Step 204 corresponds to 154 in routine 140 while step 206 corresponds to step 158 but sets the data flag true to allow continued reception of keycodes. Unlike routines 140 and 170, the re-synchronization portion of routine 200 occurs separately as part of the time-of-day interrupt handler which is executed every 10 ms. This is necessitated by the fact that since the source of data never changes, re-synchronization must be accomplished by looking for the lengthy gaps between each keycode transmission. Hence step 202 of routine 200 sets the TimeOutCtr variable to 2 each time a keyboard clock interrupt occurs. This variable is decremented by 1 at step 210 each time the time-of-day interrupt handler 208 is executed. Step 212 checks for a TimeOutCtr value of zero which indicates that between 10 and 20 ms have elapsed since the last keyboard clock interrupt occurred. This is sufficient condition to decide that there has been a transmission gap and thus step 214 initializes all flags to the correct state for receiving the next 8-bit keycode byte, as described previously for step 148 of routine 140.

When the peripheral system wishes to transmit a key code sequence to the host, the main loop software waits for a rising edge on the data flag as produced by the algorithm above. This signifies a gap in transmissions. In response, it disconnects the keyboard by asserting the "keyboard disable" signal. After a short pause, the peripheral system sends a 200 μs notification pulse out on the data line, and then clocks the first keycode out using the clock and data lines. This process is repeated until the entire key code sequence has been sent. "Keyboard Disable" is then removed.

Under program control, and presumably due to the fact that the host is not powered up, the peripheral system software may assert "host disable" and take over the host's role in communicating with the keyboard. In the case of the IBM keyboard protocol, this requires no special action at all since the keyboard can still be passively monitored exactly as described above.

While a preferred embodiment of this invention has been described and illustrated for purposes of clarity and example, many changes, substitutions and modifications to the described embodiment will be apparent to persons having ordinary skill in this field of technology without thereby departing from the spirit and scope of the invention which is defined by the following claims.

What is claimed is:

1. A peripheral microprocessor system located physically external and connected to a host computer, comprising:

a microprocessor including memory means addressed by said microprocessor;

an interface for interconnecting said microprocessor to a keyboard input of the host and to a keyboard of the host via clock and/or data lines, said interface being switched under control of said microprocessor between a first state transparent to normal communication between said host and said keyboard, and a second state connecting said microprocessor for bidirectional communication with either one of said host or said keyboard;

said microprocessor further including I/O line means connected for monitoring signals exchanged by said host and said keyboard through said interface on said clock and/or data lines;

peripheral power supply means connected to said microprocessor for powering said microprocessor and said keyboard independently of said host, whereby said keyboard is operative for providing input to said microprocessor while said host is unpowered;

program means stored in said memory means and executed by said microprocessor for powering the host from an unpowered state and then transmitting simulated keyboard characters to said host for initializing execution of an application program on said host;

power control means connected to said microprocessor for controlling power to the host under control of said program means; and means, connected to said microprocessor, for deriving a data source input to said microprocessor indicative of the source of signals on said I/O line means; said means for deriving comprising pulse sensing means for monitoring both clock and data signals exchanged between said host and keyboard on said clock and/or data lines, pulse length sensing means for determining the length of pulses of either or both of said clock and data signals, and algorithm means stored in said memory means and executed by said microprocessor for discriminating among said signals between those of said signals generated by the host and those of said signals generated by the keyboard based on said pulse length.

2. The peripheral microprocessor system according to claim 1, wherein said program means further includes means for handling a plurality of keyboard protocols for emulated keyboard communication with different host systems, and first initialization means for selecting a particular routine whereby said microprocessor automatically adapts upon initialization of said microprocessor between keyboard protocols using one of clock synchronized data and pulse length coding for communication with either said host or said keyboard.

3. The peripheral microprocessor system according to claim 2, wherein said first initialization means further comprises hardware connector means for physically connecting said host and keyboard clock and/or data lines to said host and said keyboard, said connector means including protocol identification code means read by said microprocessor for selecting said particular routine.

* * * * *